S. C. CARY.
ART OF ELECTRIC WELDING.
APPLICATION FILED MAR. 31, 1917.

1,230,114.

Patented June 19, 1917.
2 SHEETS—SHEET 1.

Inventor
Spencer C. Cary
By his Attorney
H. J. Bernhard

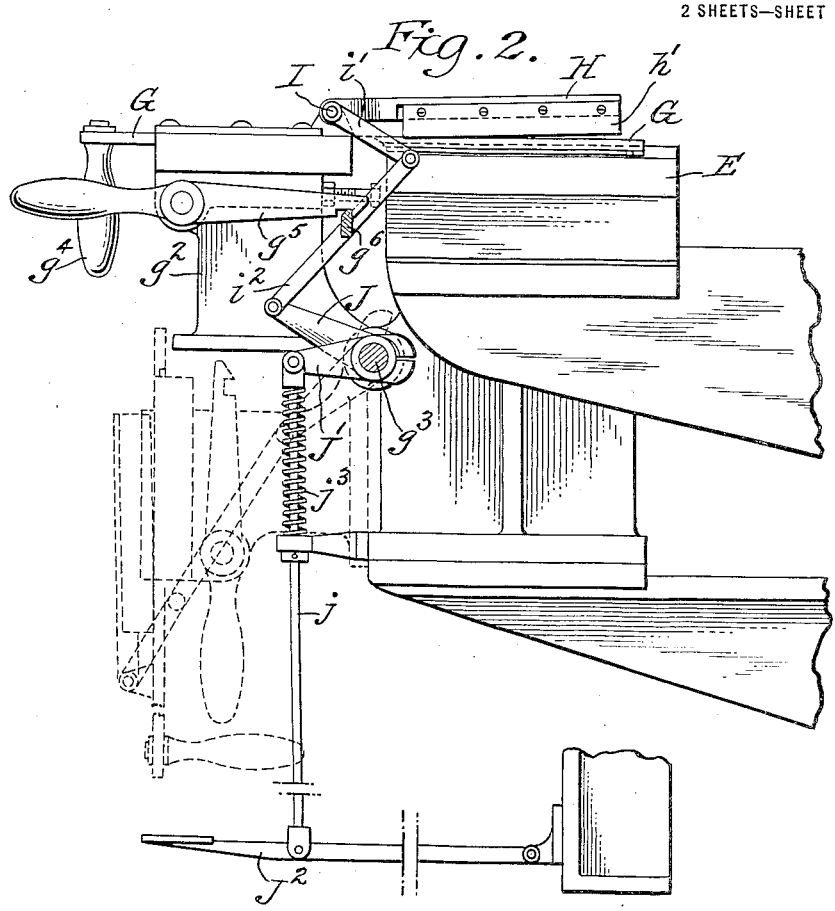
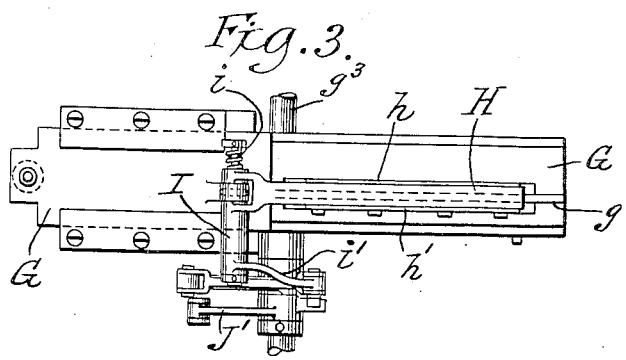
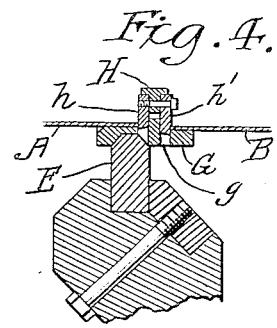

UNITED STATES PATENT OFFICE.

SPENCER C. CARY, OF BROOKLYN, NEW YORK.

ART OF ELECTRIC WELDING.

1,230,114.  Specification of Letters Patent.  Patented June 19, 1917.

Original application filed February 19, 1917, Serial No. 149,401. Divided and this application filed March 31, 1917. Serial No. 158,814.

*To all whom it may concern:*

Be it known that I, SPENCER C. CARY, a citizen of the United States, residing at the city of New York, borough of Brooklyn, county of Kings and State of New York, have invented a certain new and useful Art of Electric Welding, of which the following is a specification.

This invention pertains to the art of electric welding as hereinafter set forth.

The invention of this application is a division of a prior application filed by me on February 19, 1917, Serial No. 149,401.

In the art of welding thin sheet metal, usually sheet iron and steel, difficulty is experienced in the operation of uniting with a continuous seam and by electric heat and pressure the marginal portions of a metal sheet or the edge portions of two adjacent sheets.

One cause of the difficulty is the variable resistance to the flow of the electric current through the marginal overlapping portions, which variable resistance is brought about by a non-parallel condition of said marginal portions so that when brought into lapping relation there is more of an overlap at one side portion of the sheet or sheets than at the opposite side portion of said sheet or sheets. This condition is encountered in electrically welding the flat sheets of commerce, the edge portions of which frequently are more or less rough, but such condition is observable, more particularly, in electrically welding the marginal portions of a metal sheet which is bent prior to welding so as to assume a hollow cross sectional form, as in the manufacture of cylindrical objects, like pipe. Experience shows that in bending a relatively wide sheet to a cylindrical form, the marginal portions of the sheet are unequally lapped, notwithstanding the fact that said marginal portions may have been cut true prior to the bending operation; and when the electrical current is applied, such inequality in the lap results in a variable resistance to the flow of the heating current, frequently resulting in an imperfectly welded seam.

According to one part of this invention, the sheet or sheets are first preliminarily positioned in the work holders, the marginal portions are trimmed to bring them into overlapping relation so as to attain uniformity in the extent or degree of the overlap throughout the width of the sheet or sheets, and electric heat in conjunction with pressure is applied to secure a continuous seam by which the marginal portions are welded together in a perfect manner.

The process of electric welding as herein set forth may be, and is in practice, carried out by various constructional forms of apparatus, one of which is disclosed in my prior application to which reference has been made. As disclosed therein, the welding device embodies a plurality of coöperating current-carrying electrodes, at least one of which is a roller adapted to traverse the seam, and said electrodes coöperate in effecting a reduction of the metal along the line of the seam or weld, so as to roll the metal, rendered semi-plastic by electric heat, at said seam down to the gage of the metal, thus eliminating a protuberant rib or shoulder on the surface or surfaces of the metal at the joint between the marginal portions of the sheet or sheets.

Prior to the trimming operation upon the marginal portions of the sheet or sheets, and prior also to the welding operation, the sheet or sheets are initially positioned within appropriate work holders by the action of a gage device of suitable construction, said gage device being under manual control so as to be placed between the marginal portions of the sheet or sheets in order to accurately locate the latter. The sheet or sheets are now clamped or otherwise fixedly held in the work holders, and then the marginal portions of the sheet or sheets are trimmed by the action of suitable mechanism, the effect of which is to bring the adjacent edges of the sheet or sheets into parallelism while the same are held fixedly in the work holders.

The next step involves the positioning of the trimmed marginal portions into lapping contact, and this is effected by a relative movement between the work holders at a time when the trimmed metal is held therein, thus precluding all possibility of the trimmed metal from getting out of position or of becoming relatively displaced, and securing uniformity in the lap of one trimmed marginal portion with respect to the other trimmed marginal portion, whereby uniform resistance of the metal to the flow of the heating current is obtained. The metal is rendered semi-plastic by the flow of the heating current, and at this time one of said electrodes, preferably the roller electrode, is given a traveling movement relatively to the other electrode, such relative movement between the electrodes being in the direction of the resulting seam or weld and such electrodes applying pressure to the semi-plastic metal to effect a reduction in the thickness of the metal along the seam or weld notwithstanding the lapping contact between the marginal portions of the sheet or sheets; in other words, the metal at the seam or weld is rolled to the gage of the sheet or sheets.

In the drawings, Figure 1 is a front elevation of so much of a welding machine disclosed in my prior application as is necessary for an understanding of the process which constitutes the subject matter of the present application.
Fig. 2 is a side elevation on an enlarged scale illustrating one of the electrodes, the work-locating means and the trimming mechanism adapted to operate upon the adjacent edges of thin metal for bringing said marginal portons into parallelism.

Fig. 3 is a plan view of a part of the mechanism illustrated in Fig. 2.

Fig. 4 is a cross section through one of the electrodes, a part of the work-locating means and the trimming mechanism.

Figure 1:
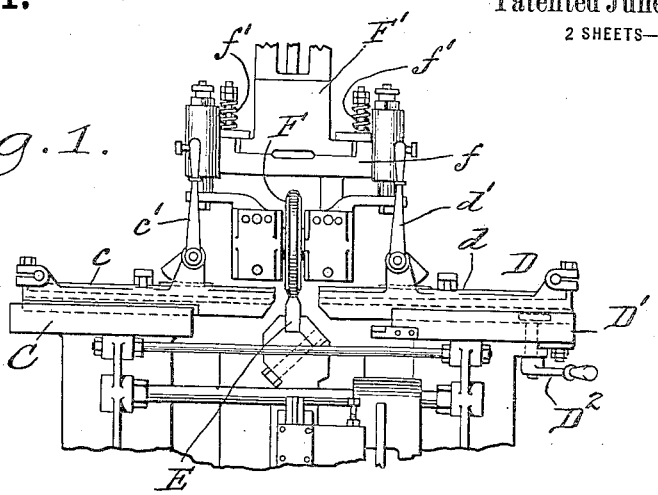
Figure 5:
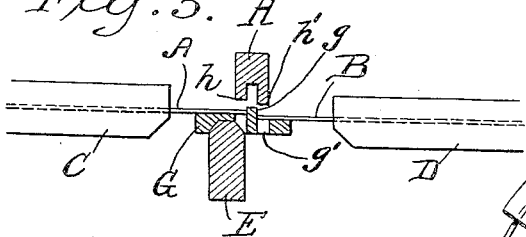
Figs. 5, 6, 7 and 8 illustrate the successive steps of treating flat thin sheets of metal so as to electrically weld the same in a manner to secure the union of the marginal portions of a sheet or sheets without leaving a protuberant rib or shoulder as illustrated in Fig. 8.

Referring to Fig. 5 of the drawings, A, B designate two flat thin pieces of metal, preferably sheet metal, which are to be manipulated and united in accordance with this invention. The metal sheet A is intended to be retained fixedly within a holder C, whereas metal sheet B is held securely in a work holder D, said work holders C D being positioned at the respective sides of an anvil E, the latter constituting one of two current-carrying electrodes, the other of said current-carrying electrodes being a roller F shown in Fig. 7. The sheets A B are initially positioned with respect to mandrel E by any appropriate mechanism, such as the gage G. Said gage is provided with a rib $g$ and with slots $g'$. The gage is movable at will, and when in position the gage is adapted to contact with anvil E so that the shoulder or rib $g$ of the gage is in the path of the marginal portions of sheets A B.

The trimming mechanism may be of any suitable character, but it is shown herein as a cutterhead H provided with cutters $h\ h'$ adapted to operate in the slots $g'$ of the gage G so as to shear past the edges of the slots $g'$ and trim the marginal portions of the sheets A B subsequent to the operation of initially positioning the sheets within the work holders C D.

The procedure in general is as follows:—

Figure 6:
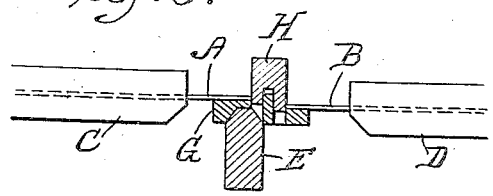
Figure 7:
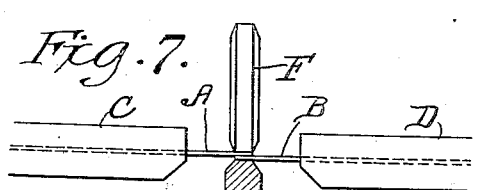
Figure 8:
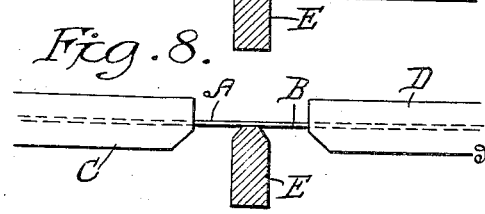

The gage G is positioned over the anvil E, and the sheets A B are moved through the work holders for the contiguous edges of the two sheets to rest upon the gage and to contact with the shoulder $g$ thereof, whereby the sheets are initially positioned. The sheets A B are now clamped in the work holders C D so as to retain them fixedly in predetermined position, and thereafter the trimming mechanism is operated (as shown in Fig. 6) for the cutters $h\ h'$ to shear off the marginal portions of the sheets A B, thus bringing said marginal portions of the sheets into parallelism. The gage and the trimming mechanism are now withdrawn from operative relation to the anvil and the sheets A B, after which the work holders and the sheets are moved relatively one to the other, thereby bringing the marginal portion of one sheet into lapping contact with the marginal portion of the other sheet, as illustrated in Fig. 7. The marginal portions of the sheets having been brought into lapping contact over the anvil E, current is supplied to the anvil electrode E and the roller electrode F, and movement is imparted to the roller electrode, whereby electric heat and pressure are applied simultaneously by the coöperating electrodes E F to the lapped margins of the sheets. The roller electrode F moves in the general direction of the resulting seam or weld, suitable provision being made for applying pressure through the roller electrode F so as to reduce the thickness of the lapped marginal portions of the sheets to the gage of the individual sheet A or B. It will be understood that the traversing movement given to the roller electrode applies the electric heat progressively to the lapped margins of the sheets, whereby the metal is rendered semi-plastic by electric heat, and the welding of the lapped margins is effected by the application simultaneously of the electric heat and the pressure by and between the coöperating electrodes. The traversing movement of the roller electrode in conjunction with the application of electric heat so as to render the lapped metal semi-plastic is effective in reducing the aggregate thickness of the metal at the lapped portions thereof to the gage of the metal of the individual sheets A or B, so that the seam or weld is substantially invisible, as illustrated in Fig. 8, the surfaces of the metal being free from a protuberant rib or shoulder along the line of said weld or seam. Subsequent to the union of the sheets, they are moved through holders C D so that the opposite end of the sheet A is retained in the holder D, whereupon a new sheet is introduced into the holder C and the operations heretofore described are repeated, whereby the sheets are welded together in end-to-end order until a desired length of sheets shall have been produced.

Figure 9:
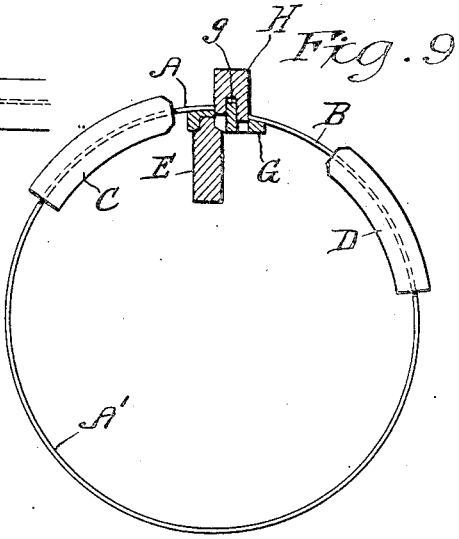
Fig. 9 is a view illustrating the operations of trimming the marginal portions of a piece of bent metal.
Figure 10:
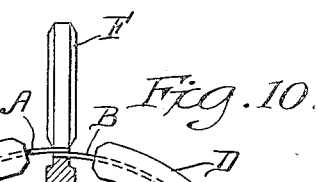
Fig. 10 illustrates the mode of electrically welding the bent metal of Fig. 9.

In Figs. 9 and 10 of the drawings there is illustrated another embodiment of the invention wherein a metal sheet A' is bent into a desired form and the marginal portions A B of said sheet are united by a welding operation in accordance with this invention. The end portions of the bent sheet pass through work holders C D so that the marginal portions A B are in overlapping relation to the gage G and in contact with a shoulder $g$ of said gage, thus initially positioning the marginal portions of the metal. The metal is now clamped in the work holders C D so as to be held in fixed relation thereto, and thereafter the trimming mechanism H is operated for the purpose of cutting the adjacent edges of the marginal portions A B. The gage and the trimming mechanism are now withdrawn and a relative movement of one holder to the other holder positions the trimmed marginal portions into lapping contact and superposes the same upon the anvil E. Current is supplied to the electrodes E F and a traversing movement is imparted to the roller electrode F so as to effect the application simultaneously of electric heat and pressure, said lapped portions of the metal being welded by a continuous seam, and said seam being rolled down to the gage of the metal by the pressure applied through the roller electrode F.

The process herein described is particularly useful in connection with flat sheets, such as A B, the edges of which are frequently in a rough, jagged or irregular condition after leaving the rolling mill, so that the edges cannot be united by the electric welding process owing to the variable resistance to the flow of electric current brought about by irregular and unequal lapping of the edge portions of the sheets. This difficulty in electric welding of sheets by a continuous seam is particularly noticeable when a sheet, such as A', is bent preliminary to welding the same, for the reason that the bending operation inevitably results in irregular lapping of the marginal portions due, apparently, to a stretch of the metal in said bending operation. The present improvement, however, obviates the difficulties which have been encountered in electrically welding sheets either in flat form or in a bent form, and enables me to join the marginal portions of the sheet by a perfect continuous seam or weld.

It is apparent that the procedure herein disclosed as constituting my improvement in the art may be carried out with various forms of apparatus, but in this connection it is proper to say that the apparatus disclosed in my prior application, and illustrated particularly in Figs. 1 to 4, inclusive, has been found to give good results.

The anvil electrode E is supported in any suitable position on the frame of the machine and between the work holders C D. The work holder C is mounted in a stationary position upon the machine frame, and it is provided with a clamp $c$ under the control of a cam lever $c'$. The work holder D is provided with a movable clamp $d$ adapted to be operated by a cam lever $d'$, said work holder D being movable within a bed D' by the action of a cam lever $D^2$, whereby the work confined in the holder D is adapted to be shifted for a definite distance with respect to the work confined in the holder C so as to effect the desired lapping contact between the marginal portions of the two sheets of metal.

The roller electrode F is supported in a suitable way by a carriage $f$ adapted to travel in contact with a guideway of an overhanging arm F', suitable provision being made for applying pressure to the roller electrode F, as for example by the spring $f'$. Suitable means are employed for imparting the traversing movement to the carriage $f$ and the roller electrode F, and provision is made also for feeding the required welding current to the anvil electrode E and the roller electrode F.

The gage G is slidably fitted to a carrier block $g^2$, the latter being hung on a shaft $g^3$, said gage being fashioned in cross section to snugly fit the top surface of the anvil electrode E, and the outer end of the gage is provided with a suitable operating handle $g^4$. The carrier block $g^2$ supports a latch $g^5$ adapted for engagement with a locking bar $g^6$, whereby the carrier block is locked in position when the gage occupies an operative relation to the work holders and the anvil electrode.

The cutterhead H which carries the two cutters $h\ h'$ is pivotally mounted on the gage G, as shown more particularly in Figs. 2 and 3, said cutterhead being retained normally in a raised position by a spring $i$. The cutterhead is attached to a rockshaft I provided at one end with a crank-arm $i'$, to the lower end of which crank-arm is pivoted a link $i^2$ attached to a rocker J mounted loosely on the shaft $g^3$. This rocker coöperates with rocker J' to which is connected a link $j$, the lower end of which is attached to a treadle $J^2$ adapted to be held by a spring $J^3$ in a raised position, as in Fig. 2.

When the carrier block $g^2$ is raised and locked by the latch $g^5$, the gage C is moved over the anvil electrode E, and at the same time the cutterhead is brought into a position for operation, although the spring $i$ acts to lift the cutterhead free from contact with the gage, whereby the marginal portions A B of the metal may be adjusted or positioned upon the gage and into contact with the shoulder $g$ thereof. After the metal shall have been clamped in the work holders, the operator depresses the treadle $J^2$ and the cutterhead is operated to simultaneously trim the edges of the marginal portions A B of the metal, subsequent to which operation the gage and the trimming mechanism are withdrawn, whereupon the holder D is moved by the lever $D^2$ so that the marginal portion B of the metal is brought into lapping contact with the marginal portion A of the metal over the anvil electrode E. Current is now supplied to the two electrodes and movement is given to the roller electrode for the purpose of supplying electric heat to said lapped metal in a manner to render the same semi-plastic, the traversing movement of the roller electrode F applying the required pressure to the semiplastic metal in order to roll said metal along the seam or weld down to the gage of the individual sheets or of the bent sheet.

Having thus fully described the invention, what I claim as new and desire to secure by Letters Patent is:—

1. In the art of electrically welding thin metal, the improvement which consists in initially positioning the marginal portions of thin metal contiguous to each other, removing from said marginal portions narrow strips of metal so as to bring the resulting edges into parallelism, lapping the trimmed edges of the marginal portions by a lap uniform throughout the width of the metal and affording resistance uniformly to the flow of an electric heating current, and applying electric heat and pressure to the lapped margins of said metal to produce a continuous seam.

2. In the art of electrically welding thin sheet metal, the improvement which consists in initially positioning the marginal portions of thin sheet metal contiguous to each other, trimming said marginal portions subsequently to said initial positioning thereof, whereby the resulting edges of said marginal portions are brought into parallelism, moving said trimmed marginal portions relatively one to the other for securing lapping contact thereof to a uniform extent across the width of the metal, whereby said lapping marginal portions offer electrical resistance uniformly at substantially all points, and applying electric heat and pressure to the lapping marginal portions of the metal.

3. In the art of electrically welding thin metal, the improvement which consists in trimming the marginal portions of the thin metal to bring into parallelism the contiguous edges of said marginal portions, effecting a relative movement between said marginal portions and positioning the same into lapping contact, said lapping contact being uniform in width across the metal and thereby affording resistance to the flow of electrical current uniformly across the resulting seam, and feeding electrical current and simultaneously therewith applying pressure to the lapping marginal portions of the metal to effect the union thereof by a continuous seam.

4. In the art of electrically welding thin metal, the improvement which consists in initially positioning the marginal portions of thin metal contiguous to each other and within suitable holders, retaining said positioned marginal portions in fixed relation to said holders, thereafter trimming said marginal portions and securing parallelism between them, moving said marginal portions relatively one to the other and into lapping contact, the width of which is uniform across the sheet or sheets, whereby said uniformly lapped and contacting marginal portions offer electrical resistance to the flow of an electric heating current uniformly at all points throughout the overlap, and applying electric heat and pressure to said lapping marginal portions of the metal.

5. In the art of electrically welding thin metal, the improvement which consists in bending thin metal to a desired form, retaining the marginal portions of the metal in fixed relation to each other in suitable work holders, thereafter trimming said marginal portions and securing parallelism between the same, moving said marginal portions relatively to each other and into lapping contact to attain uniformity on the overlap and to afford resistance uniformly to the flow of a heating current, and applying electric heat and pressure to the lapped marginal portions of the metal.

In testimony whereof I have hereunto signed my name.

SPENCER C. CARY.